June 27, 1967 R. F. WERNLUND 3,328,687
FREQUENCY DISCRIMINATOR HAVING OSCILLATORS WHICH ARE SELECTIVELY CONTROLLED TO INDICATE THE VALUE OF UNKNOWN INPUT FREQUENCY
Filed Feb. 15, 1966
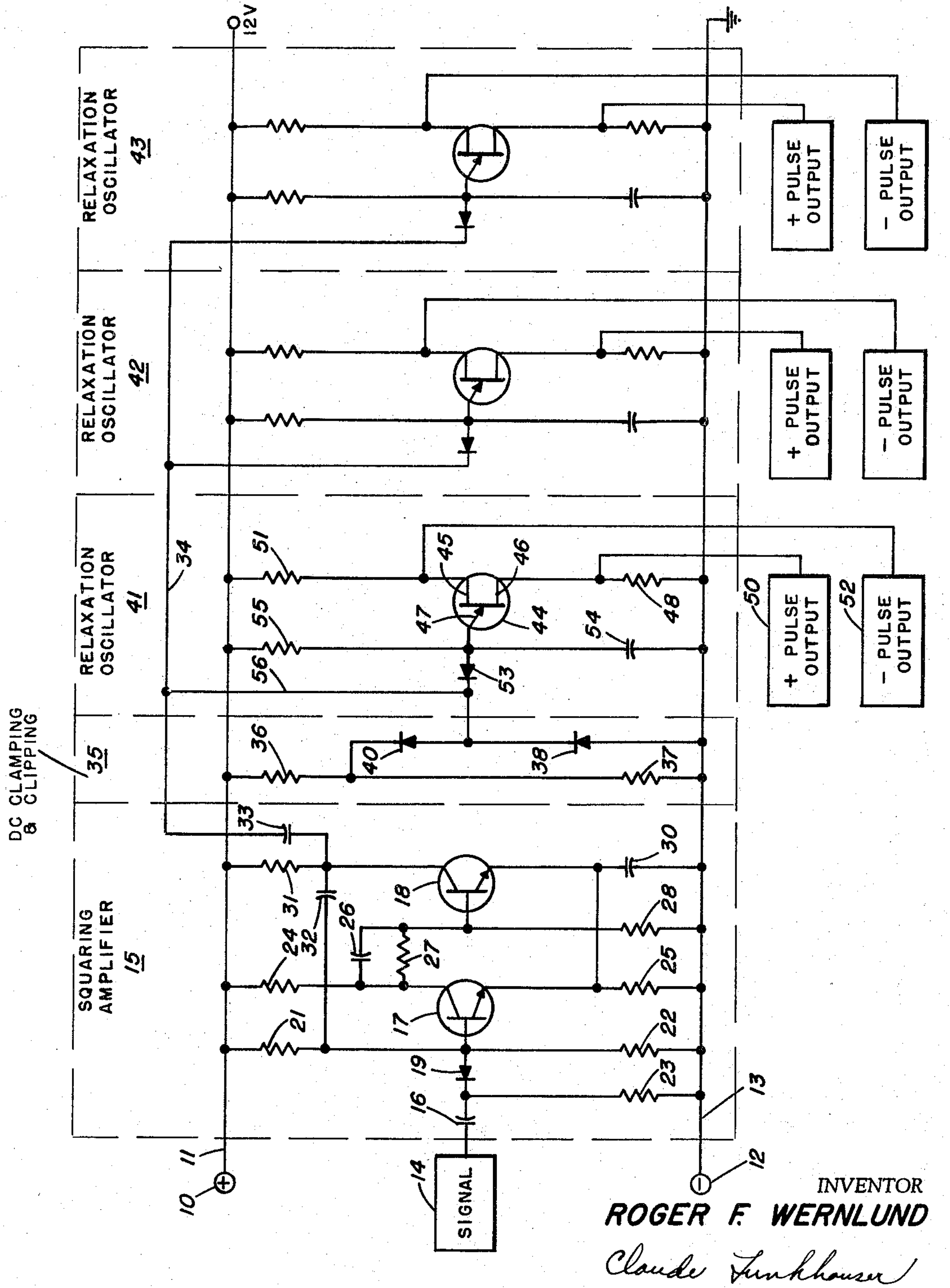
INVENTOR
ROGER F. WERNLUND
BY Claude Funkhouser
ATTORNEY
R. R. Anderson
AGENT United States Patent Office 3,328,687

Patented June 27, 1967

3,328,687

FREQUENCY DISCRIMINATOR HAVING OSCILLATORS WHICH ARE SELECTIVELY CONTROLLED TO INDICATE THE VALUE OF UNKNOWN INPUT FREQUENCY

Roger F. Wernlund, Lake Osborne Estates, Fla., assignor, by mesne assignments, to the United States of America as represented by the Secretary of the Navy Filed Feb. 15, 1966, Ser. No. 529,178
1 Claim. (Cl. 324—79)

ABSTRACT OF THE DISCLOSURE

A frequency discriminator for low audio regions wherein a plurality of unijunction relaxation oscillators are diode coupled to a squaring amplifier. A signal of unknown frequency when applied to the squaring amplifier will affect the period of the oscillator to indicate whether the unknown frequency is above or below a fixed known frequency.

The present invention relates to frequency discriminating apparatus and more particularly to frequency discriminating apaparatus which is used to detect the fundamental frequency of a signal in the low audio region and to determine if it is greater than or less than a predetermined value.

The prior methods of detecting the fundamental frequency of a signal relied upon one of several standard, accepted procedures. These consisted of (1) use of tuned circuits operating with low pass or high pass filters followed by an alternating current amplitude detector, or (2) by the use of integrating circuits, such as a frequency to voltage converter, followed by a direct current level detector, or (3) by the use of resonant reed relays which vibrate at a specifiic, predetermined frequency.

While the prior art methods were effective within limits they had their drawbacks, and often left much to be desired in the areas of accuracy and reliability. For example, the tuned circuits and similar devices often became unwieldy and too large, particularly when working at low audio frequencies, such as 100 c.p.s. Frequency to voltage converters become too complex and usually require 3 to 5 cycles of the input frequency in order to obtain full response. Also stable direct current level detectors are complex and bulky. Finally, resonant reed relay banks are subject to shock and vibration and are too large; hence not suitable for present day application.

The present invention overcomes the disadvantages and failings of the old systems and offers an efficient and fast-acting frequency selector. The invention discloses circuitry which is small in size and light in weight so that it is readily adaptable for use in modern, space-weight critical equipment. Furthermore, since the circuit utilizes transistors in place of vacuum tubes there is very little drain on the power source, the system will operate accurately under shock and vibration, and it is stable with time, temperature and supply voltage. The circuit will function accurately regardless of the applied signal waveshape and will respond completely within 1 or 2 cycles of the applied signal. In short, the invention offers a specific step forward in the art of frequency discriminating apparatus.

An object of the present invention is the provision of a frequency discriminating apparatus for determining the fundamental frequency of a signal in the low audio region.

Another object is the provision of a frequency discriminating apparatus which can determine if the fundamental frequency of a signal is greater than or less than a predetermined value.

Another object is the provision of a frequency discriminating apparatus which is small in size, light in weight, and draws very little power.

Still another object is the provision of a frequency discriminating apparatus which operates under shock and vibration.

Yet another object is the provision of a frequency discriminating apparatus which is stable with respect to time, temperature and supply voltage.

Still another object is the provision of a frequency discriminating apparatus which will function independently of the waveshape of the applied signal.

Another object is the provision of a frequency discriminating apparatus which will respond completely within 1 or 2 cycles of the applied signal.

Other objects, advantages and novel features of the invention will become apparent from the following detailed description of the invention when considered in conjunction with the accompanying drawing wherein:

The drawing shows a circuit diagram of the system making up the invention.

Referring now to the drawing there is shown a positive terminal 10 which is used to apply a positive 12 volt potential to the associated power bus bar 11, while a negative terminal 12 is used to keep bus bar 13 at ground potential.

An input terminal 14 is used to apply to the system an unknown signal, the fundamental frequency of which it is desired to determine. Connected to the input terminal 14 is a squaring amplifier, shown generally as 15, which consists of a coupling capacitor 16, tied to terminal 14, and two NPN transistors 17 and 18, which may be of the 2N706 type, for example. Connected between the coupling capacitor 16 and the base of transistor 17 is a diode 19, such as one of the 1N914 type, for example, the cathode of the diode being connected to the capacitor and the anode to the transistor. Forming a voltage divider network between bus bar 11 and bus bar 13 are two resistors 21 and 22, the midpoint between them producing the potential for the base of transistor 17. A dropping resistor 23 links the cathode of diode 19 with ground bus bar 13.

The collector of transistor 17 receives its positive potential from bus bar 11 by means of a series connection with a resistor 24 while resistor 25 joins the emitter with ground. A time constant circuit consisting of a capacitor 26 and a resistor 27 forms a series circuit with another resistor 28 between the collector of transistor 17 and ground bus bar 13.

Moving on to transistor 18 it will be observed that its emitter is tied to the emitter of 17 and the two are connected to ground by a capacitor 30, this capacitor 30 being in parallel with resistor 25 which is also connected between the joint terminal of the two emitters and ground. The collector of transistor 18 is connected to the source of potential by means of a resistor 31, the inner end of resistor 31 being tied to the inner end of resistor 21 by means of a capacitor 32. Another capacitor 33 forms a series connection between the inner end of resistor 31 and a lead 34, the use of lead 34 being more fully described hereinafter.

To the output of squaring amplifier 15 is connected a direct current clamping circuit, shown generally as 35. The components making up clamping circuit 35 consist of a voltage divider positioned between bus bar 11 and ground, the voltage divider being made up of series connected resistors 36 and 37. Also forming components of the clamping circuit 35 are two series connected diode rectifiers 38 and 40, these rectifiers being so connected that the anode of 38 is tied to ground and the cathode of 40 is joined to the inner end of resistor 36. Diode rectifiers 38 and 40 may be 1N914, or other similar type, for example.

Following the direct current clamping stage 35 are a plurality of relaxation oscillator stages such as 41, 42, 43, etc., the number of such stages being determined by the number of fundamental frequencies desired. Selection of the proper resistance-capacitance components of each stage will determine the operating point of the oscillator, and therefore the frequency response of that stage. For example, in the drawing stage 41 responds to 116 cycles per second and stage 42 to 82 cycles per second, with stage 43 responding to any other frequency.

Since the circuitry is the same for all of the oscillator stages, only stage 41 will be described in detail with the understanding that this procedure is done for simplicity only and in no way is to be considered restrictive. The heart of each relaxation oscillator stage is a unijunction transistor, such as 44, which may be of the 2N492 type, and having an emitter 47, a first base 45, and a second base 46. Second base 46 is tied to ground through a resistor 48, with the inner end of the resistor producing an output pulse over terminal 50 which is positive in polarity. First base 45 is tied to potential bus bar 11 by means of a resistor 51, with the inner end of the resistor producing an output over terminal 52 which is negative in polarity. Input to the stage and therefore to unijunction 44 is accomplished by means of a connection to the common junction between diode rectifiers 38 and 40, this connection being made by means of a diode rectifier 53 leading to emitter 47 of unijunction 44. The diode rectifier may be of the 1N914 or similar type and has its polarity so directed that its anode is joined to emitter 47 and its cathode is connected to the junction of diodes 38 and 40. Positioned across diode 53 so as to extend between the potential bus bar 11 and ground is a capacitor-resistor circuit, a capacitor 54 being positioned between diode 53 and ground, while a resistor 55 couples the diode 53 to bus bar 11. A lead 56 joins the diode 53 with lead 34, this lead 34 in turn connecting with the squaring amplifier 15 by means of capacitor 33.

Turning now to the operation of the invention it will be noted that if no alternating current input signal is present at input terminal 14 the unijunction transistor oscillator stages 41, 42, 43, etc., operate in normal fashion. This is made possible by choosing the bias potential of resistors 36 and 37 of the clamping circuit 35 to be more positive than the emitter 47 of any unijunction transistor at the time it breaks down and conducts. Consequently, diode rectifier 53 is always reverse biased and may be considered as an open circuit. The presence of a repetitive pulse across resistors 48 or 51, and therefore terminals 50 or 52, can be used as an output, indicating that the input frequency at terminal 14 is below the preset limit. The output from terminals 50 or 52 can be used to actuate relays, controlled rectifiers, or other utilization circuits.

If a signal of a given frequency is present at the input 14 of squaring amplifier 15 this device will be driven to produce a narrow negative going pulse once each cycle, the width of the pulse being controlled by resistor 27 and capacitor 26. The narrow pulse is coupled to the clamping circuit 35 through coupling capacitor 33 where the resultant amplitude is limited and given the necessary direct current bias level for proper control of the relaxation oscillators 41, 42, and 43. The pulse is capable of driving the cathode of diode rectifier 53 below ground potential (but it is limited to ground potential by diode 38) and hence, if significant charge exists in capacitor 54 it will be removed through diode 53 once each cycle of the input frequency. The relaxation oscillators require that a charge be accumulated in capacitor 54 of sufficient magnitude to cause unijunction transistor 44 to break down and conduct. Removal of the charge from capacitor 54 to the squaring amplifier through diode 53 slows down or completely stops the oscillation of the relaxation oscillators. In practice it has been found that any oscillator will stop operating at about 80% of its free running frequency.

As an example, a free running oscillator such as transistor 44 will operate with a repetition rate of about 145 cycles per second, but will be controlled at 116 cycles per second. If no input is present, or if a very low frequency is present, the output will provide a 145 cycle per second signal. As the input frequency increases toward 116 cycles per second the output will reduce in frequency and become somewhat irregular, but it will always produce a pulse at least every 12 milliseconds at the output. With 115 cycles per second at the input, the output will synchronize and provide a 115 cycle output signal. In this special case, the relaxation oscillator breaks down just prior to the occurrence of a negative control pulse, but the start of recharging the capacitor (54) is delayed by the action of the control pulse until it disappears; hence, the synchronizing action. With 116 cycles at the input the oscillator will not operate and therefore no pulses are present in the output. Higher input frequencies will totally block the oscillator. Sharp and clean control action is obtained in a very narrow band.

The main requirement for stability is that the control pulse have constant amplitude, constant width and a constant direct current bias. One such circuit is shown and described, but it is obvious that any form of overdriven, saturating stage may precede the oscillator and be direct current coupled to the oscillator for control purposes.

If it is desired to control the frequency of any of the oscillator stages 41, 42, 43, etc., this may be done by varying resistor 55 or capacitor 54, or by returning resistor 55 to a variable and controllable direct current voltage.

Also, remote on-off control of the system can be easily achieved by returning resistor 55 to a separate bus bar whose potential can be set at 12 volts or 0 volts by a switch or a control circuit. A diode placed across resistor 55 with its cathode to the supply bus (that is the arrow pointing up in the drawing) will remove all charge from capacitor 54 at the instant the bus is switched to ground potential, thereby preventing a final oscillation from any oscillator caused by transients. Single cycle response is achieved since the circuit is reset each cycle of the input frequency and/or each cycle of the oscillator.

From the above detailed description of the structure and operation of the present invention it is obvious that the disclosed device offers a material improvement over prior known frequency selective systems. The device described is small in size, light in weight, and uses very little power. Furthermore, it operates efficiently under shock and vibration while at the same time offering unusual stability with respect to time, temperature, and supply voltage.

Obviously many modifications and variations of the present invention are possible in the light of the above teachings. It is therefore to be understood, that within the scope of the appended claim, the invention may be practiced otherwise than as specifically described.

What is claimed is:

Frequency discriminating apparatus comprising a plurality of transistors having their emitters joined together, the transistors functioning as a squaring amplifier;

means for applying an input signal of unknown frequency to the squaring amplifier;

resistance-capacitance means connected between the transistors to determine the width of the output pulses from the squaring amplifier;

a plurality of unijunction transistors, each operating as a relaxation oscillator and functioning at a different frequency, all of said oscillators being connected in parallel;

a DC clamping and clipping circuit for biasing the relaxation oscillators;

unidirectional means connected at the input of each oscillator;

capacitance means connected to each oscillator to cause its conduction and determine its frequency of oscillation;

means connecting the output of the squaring amplifier to all of the relaxation oscillators simultaneously through their respective unidirectional means whereby an output from the squaring amplifier due to the receipt of an unknown signal at its input will cause all of the unidirectional means to conduct thereby reducing the charge on each capacitance means proportional to the frequency of the unknown signal, the reduction of said charges altering the period of oscillation of all the relaxation oscillators; and means connected to the output of each relaxation oscillator to indicate whether its altered period of oscillation due to the unknown signal is above or below the fundamental frequency of the oscillator.

References Cited

FOREIGN PATENTS 1,316,576 12/1962 France.

ROY LAKE, *Primary Examiner.*

JOHN KOMINSKI, *Examiner.*